March 10, 1953 R. D. ACTON 2,630,687
TRUCK REFRIGERATION UNIT
Filed April 10, 1948 6 Sheets-Sheet 1
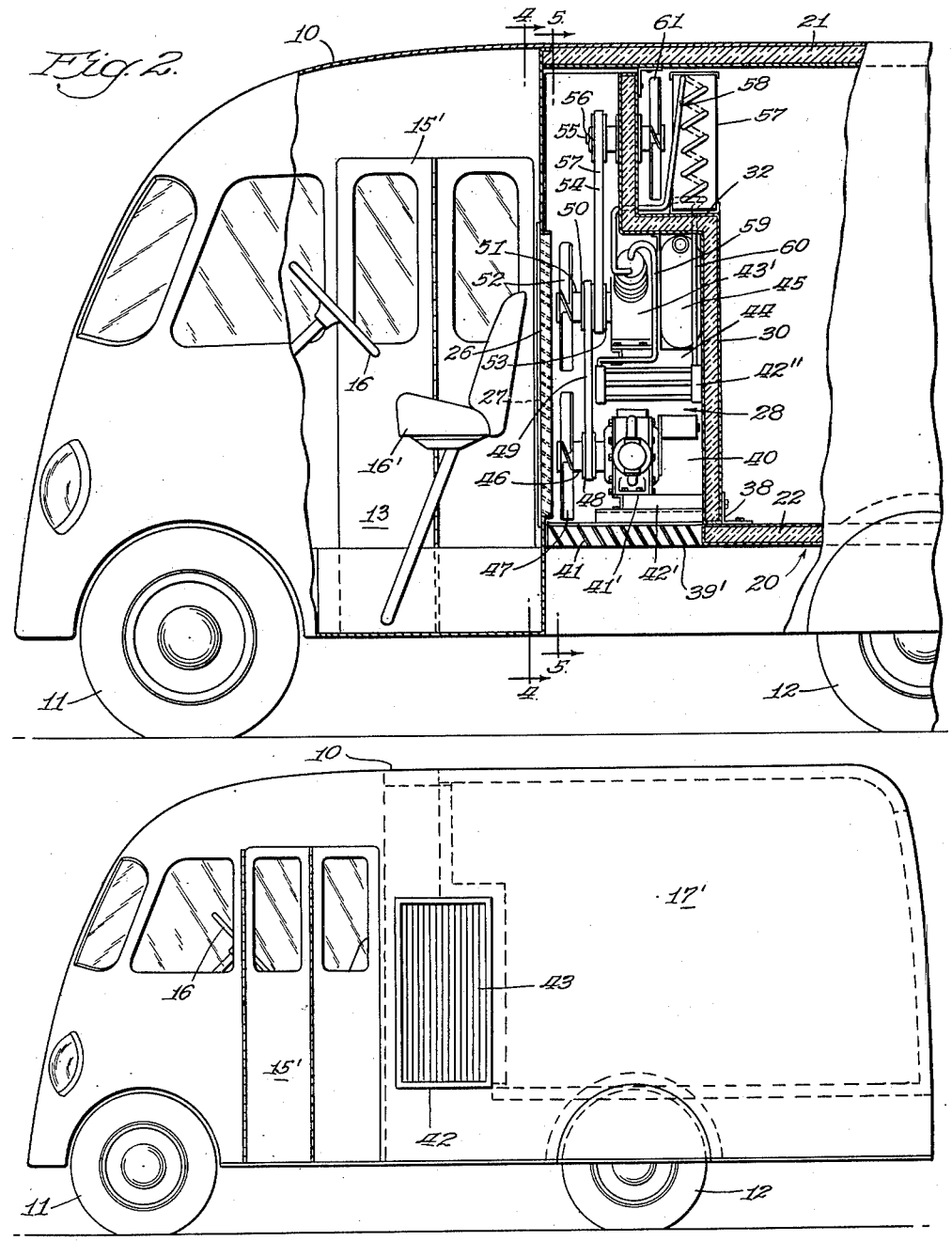
Inventor.
Russell D. Acton March 10, 1953    R. D. ACTON    2,630,687
TRUCK REFRIGERATION UNIT
Filed April 10, 1948    6 Sheets-Sheet 2
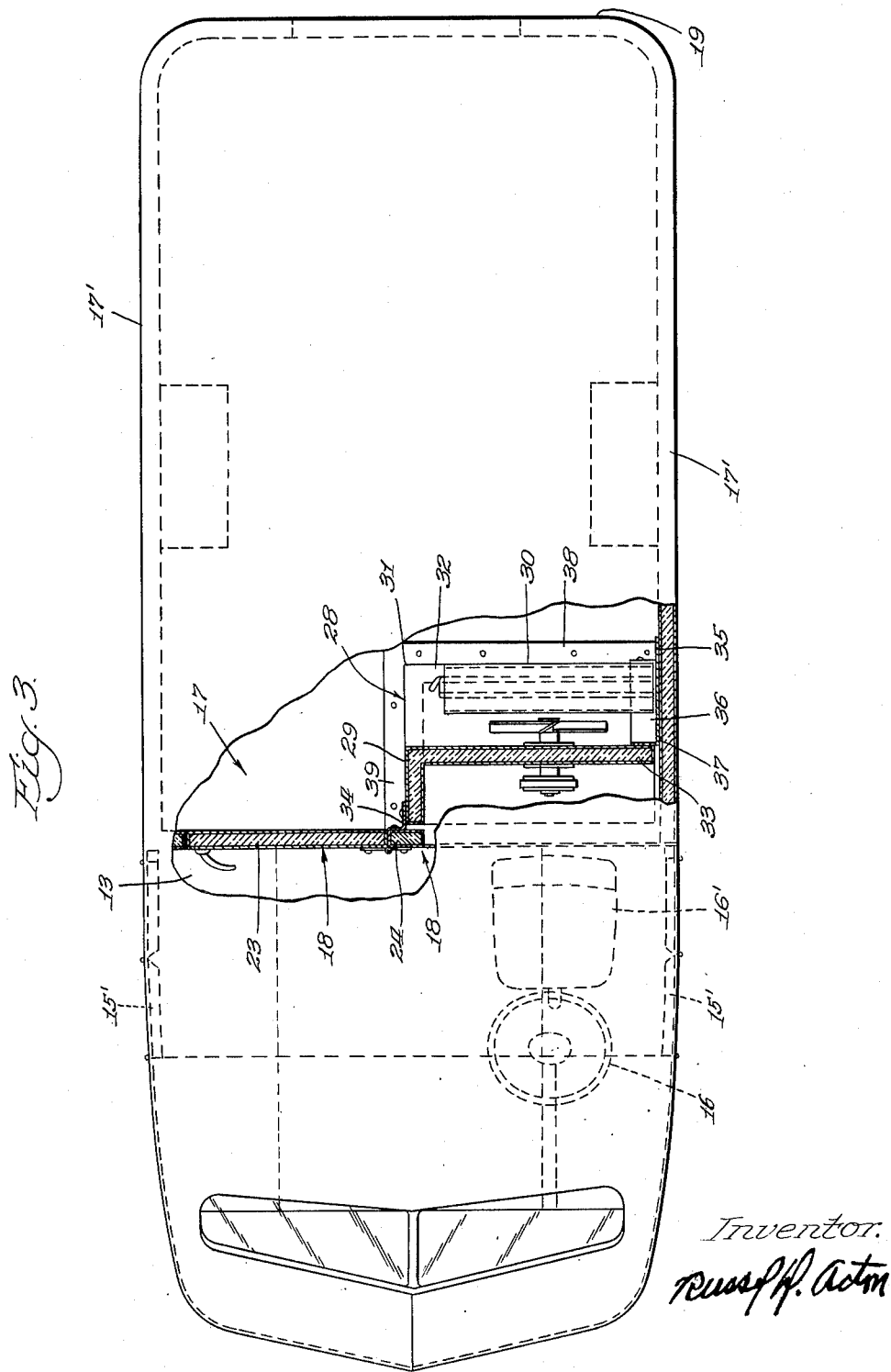
Inventor.
Russ H. Acton

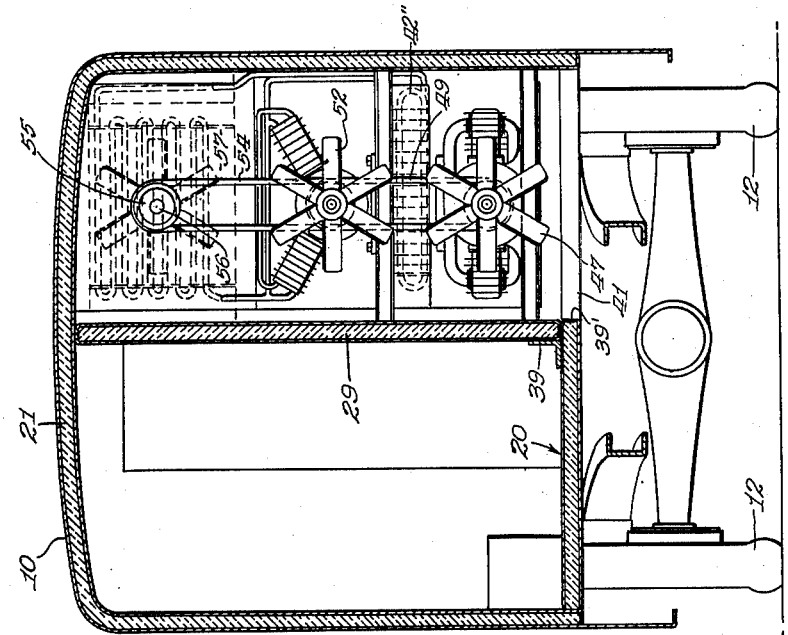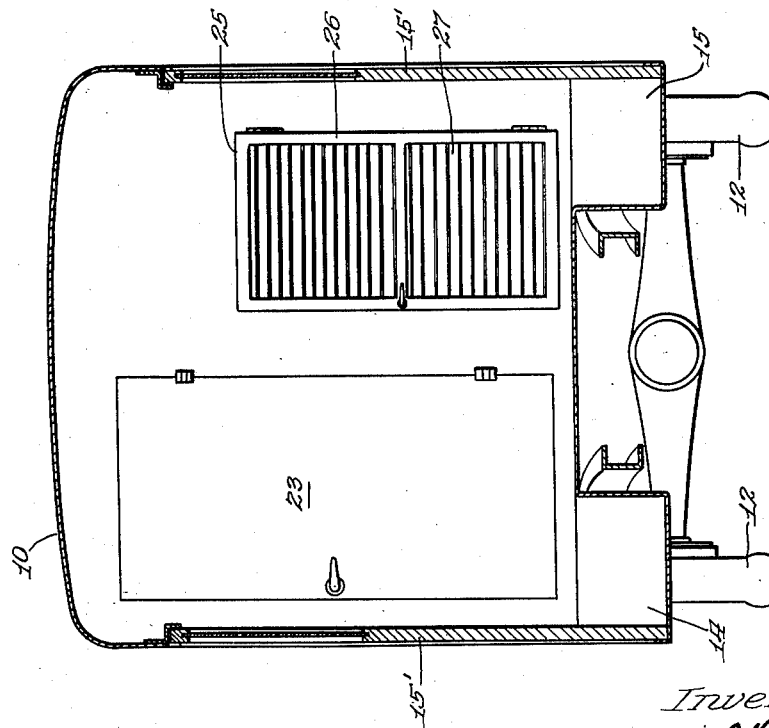

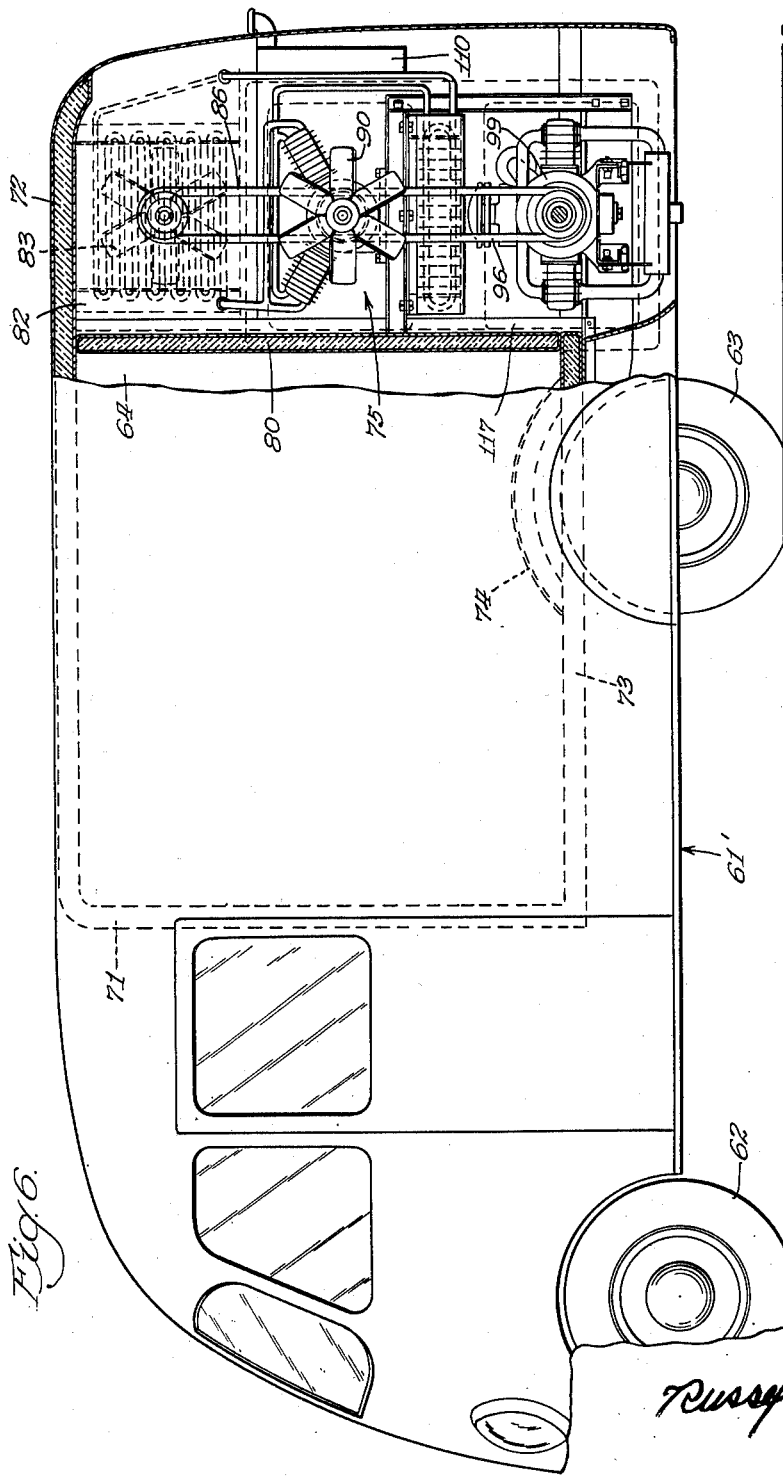

March 10, 1953  R. D. ACTON  2,630,687
TRUCK REFRIGERATION UNIT
Filed April 10, 1948  6 Sheets-Sheet 5
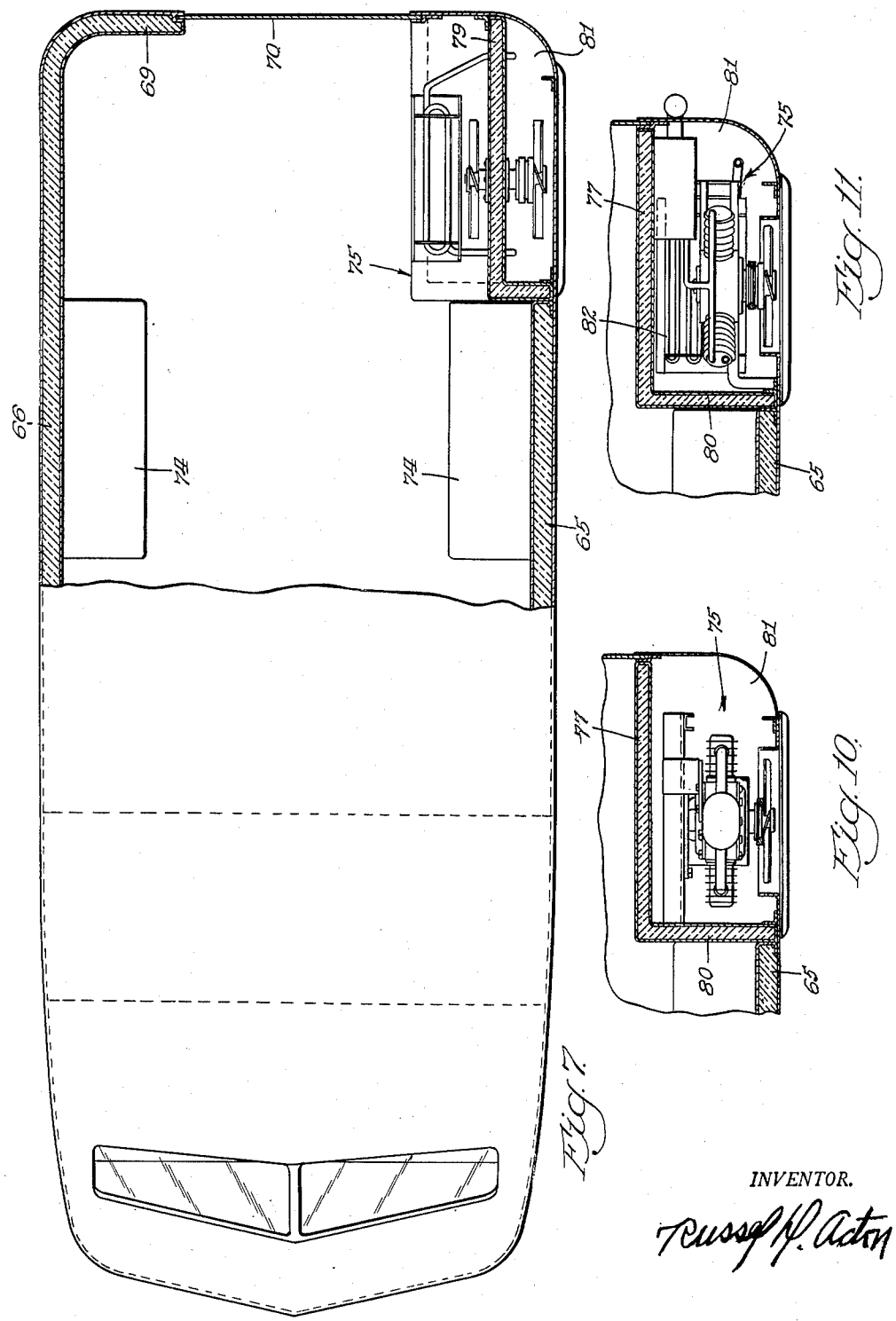
INVENTOR.
Russel D. Acton March 10, 1953  R. D. ACTON  2,630,687
TRUCK REFRIGERATION UNIT
Filed April 10, 1948  6 Sheets-Sheet 6
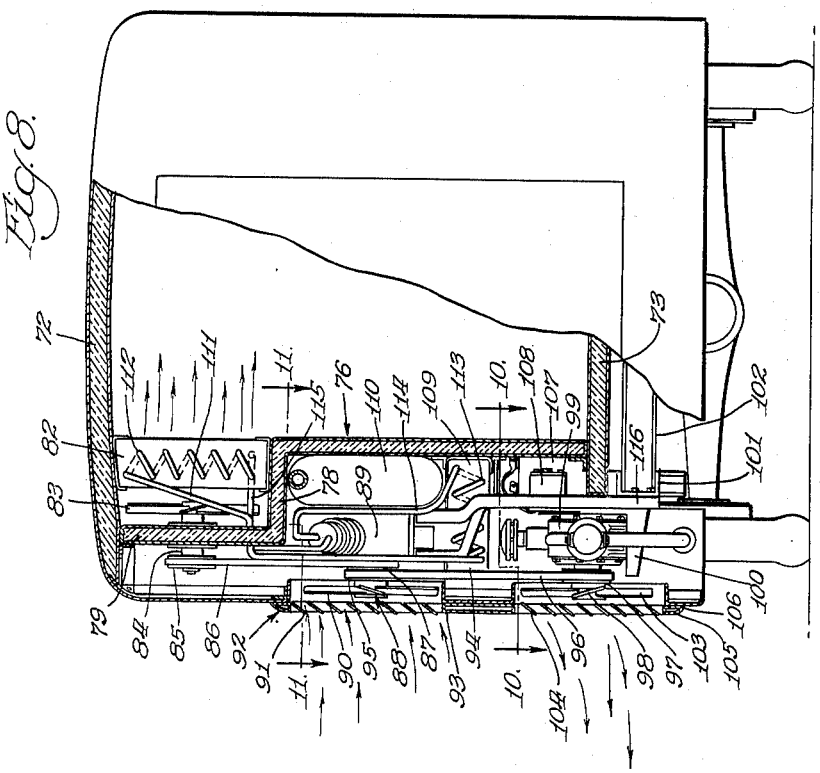
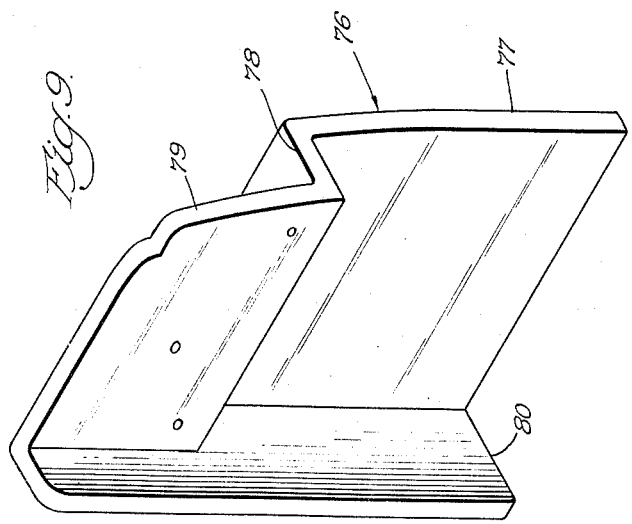
INVENTOR.
Russell D. Acton Patented Mar. 10, 1953

2,630,687

UNITED STATES PATENT OFFICE 2,630,687

TRUCK REFRIGERATION UNIT

Russel D. Acton, Chicago, Ill.

Application April 10, 1948, Serial No. 20,315

10 Claims. (Cl. 62—117)

This invention relates to a refrigeration unit for automotive vehicles. More specifically, it relates to a particular construction of a stack arrangement of the components of a refrigeration unit and a wall construction which permits easy installation of such a unit in an insulated body of a motor vehicle.

With the advent of frozen foods it is becoming more important to have refrigerated vehicles of a relatively small size for retail delivery and otherwise transporting such frozen foods. A delivery vehicle is usually of such a size and load capacity that a problem is encountered in finding sufficient room for a refrigeration unit without reducing to a great extent the capacity of the refrigerated space.

The principal object of the present invention is to construct a refrigeration unit and so arrange its component parts that it may be readily mounted in a refrigerated vehicle body to occupy a minimum amount of space.

Another important object is to vertically stack and arrange a refrigeration unit for insulated vehicle bodies to occupy a minimum amount of floor area.

Another important object is to construct a unitary refrigeration device for motor trucks having a minimum of additional wall area so arranged that the unit may be placed in the most comfortable corner of a rectangular load space.

Another object is to so vertically stack an engine compressor, condenser and evaporator that they occupy substantially the same horizontal area and such that driving connections occupy a minimum amount of space.

Another object is to provide a vertically stacked refrigeration unit having a horizontal offset at the upper end over a portion only of a heat rejecting space, whereby an evaporator with its fan may be mounted in the refrigerated space over said offset and whereby driving connection for the fan may be provided for the remaining portion of the heat insulating space not occupied by the offset.

The above objects and others which will be apparent from the detailed description to follow are attained by a construction as shown in the drawings in which:

Fig. 1 is an elevation of a delivery vehicle with a unit involving the invention installed therein;

Fig. 2 is an enlarged view of the front portion of Fig. 1 with the side wall of a vehicle broken away to show a refrigeration unit embodying the invention;

Fig. 3 is a plan view of the vehicle of Figs. 1 and 2 with a portion of the roof structure broken away to better show the outlines of the refrigeration unit and the construction of the upper end of said unit;

Fig. 4 is a section taken on the line 4—4 of Fig. 2;

Fig. 5 is a section taken on the line 5—5 of Fig. 2;

Fig. 6 is an elevation of a modification with a refrigeration unit mounted at the rear of the delivery vehicle, the side wall being broken away by a vertical section to better show the component parts of the refrigeration device;

Fig. 7 is a plan view of the structure shown in Fig. 4 with a portion of the roof broken away by a horizontal section to show the construction of the upper portion of the refrigeration unit;

Fig. 8 is a transverse vertical section taken substantially on the line 8—8 of Fig. 8;

Fig. 9 is a diagrammatic perspective view of the insulating walls which form a part of the refrigeration unit and cooperate with the insulated walls of the vehicle to provide a heat rejecting compartment.

Fig. 10 is a section taken on the line 10—10 of Fig. 6; and

Fig. 11 is a section taken on the line 11—11 of Fig. 6.

As shown in Figs. 1 to 5, inclusive, an automotive vehicle having a body 10, which completely surrounds front wheels 11 and rear wheels 12, is provided with a transversely extending driver's compartment 13 at the forward ends thereof immediately back of the front wheels 12. Load spaces 14 and 15 are formed at opposite ends of said driver's compartment to provide for easy access. Folding hinge doors 15' are provided at the sides of the body. An operator's station is provided at one side of the transverse operator's compartment 13, a steering wheel 16 being shown as well as an operator's seat 16'.

A rectangular load compartment designated in its entirety by the reference character 17 is formed essentially by side walls 17' of the body, a front wall designated in its entirety by the reference character 18, a rear wall 19, a bottom wall in the form of a floor 20 and a top wall formed as a roof 21. Said walls, as indicated, are covered by a thickness of insulation 22.

The front wall 18 is considerably modified as will be hereinafter described. A hinge door 23 occupies substantially half of said front wall, providing access from the transverse driver's compartment 13 to the load compartment 17. A center portion of insulated wall structure 24 separates the door from a large opening 25 as best shown in Fig. 4. Said opening is covered by a hinge door 26 having a plurality of louvers 27 for the circulation of air through the opening 25.

A refrigeration unit designated in its entirety by the reference character 28 is mounted directly back of the driver's station adjacent the front wall 18 occupying substantially half of the lateral width of the load compartment at this location and occupying the remainder of the space not taken up by the door 23.

The refrigeration unit 28 has a wall section consisting generally of two walls, a longitudinally extending wall 29 and a transversely extending wall 30 joined to form a corner 31. Said insulated walls, as best seen in Fig. 3, abut against one of the side walls 17' and the center portion 24 of the front wall to form a heat rejecting compartment on one side of the wall section and to maintain the insulated refrigeration space in the load compartment 17. The wall 30 of the refrigeration unit is provided with a horizontal offset 32 which extends over substantially half of the longitudinal width of the heat rejecting compartment and joins with a vertically extending wall 33 which extends to the roof 21 of the body 10. The purpose of this offset and its relationship to the remaining part of the refrigeration unit will be subsequently described.

It will be noted that the refrigeration unit wall section, including the walls 29, 30, 32 and 33, are removably inserted in the corner of the load compartment immediately back of the operator's station. It is intended that the entire unit be removable and for that reason loosely fitted spaces have been provided as indicated between said walls and the walls 17'. To seal the space between the insulated walls of the refrigeration unit and the insulated walls of the load compartment, sealing members which are right angle in cross-section are applied as illustrated. Fig. 3 shows a vertically disposed sealing and securing angle 34 and an angle 35 extending upwardly along the wall 30 being joined with an angle 36 extending horizontally over the horizontal wall 32. Said angle continues as a vertical angle 37 joining the wall 17' with the vertical wall 33. Figs. 2 and 3 show an angle 38 joining the floor 20 to the vertical wall 30. Figs. 3 and 5 show an angle 39 which is a continuation of the angle 38, joining the floor 20 to the vertical wall 29 of the refrigeration unit.

An opening 39' of substantially the same area as the floor area of a heat rejecting space designated as 40 within the refrigeration unit is covered by a plurality of louvers 41 which permit the circulation of air through said opening.

As best shown in Fig. 1 a large opening 42 is formed in the side wall 17' corresponding to the vertical cross-section of the heat rejecting compartment 40. Said opening is covered by a grill structure 43.

The walls 29 and 30 of the refrigeration unit are formed to have substantial structural strength. As shown in Fig. 2 an internal combustion engine 41' is mounted on a supporting structure 42' carried by the wall 30 of the refrigeration unit. A condenser 42'' is also carried by said wall spaced above the engine 41'. A compressor 43' is carried on a bracket 44 secured to and carried by the wall 30. A gasoline tank 45 is illustrated for the engine 41'. Said engine carries a rotatable structure 46 having a circulating fan 47 thereon and a pulley 48. Said pulley is joined by a belt 49 with a pulley 50 carried by a rotatable structure 51 which is a part of the compressor 43'. A fan 52 is also carried with the rotatable structure 51. A second pulley 53 on the rotatable structure 51 of the compressor is connected by a drive belt 54 with a pulley 55 mounted on the shaft 56. Said shaft extends to the vertical wall 33 carrying a circulating fan 61 between the wall 30 and an evaporator 57. The evaporator is carried on the horizontal offset wall 32 within the vertically projected floor area confines of the floor occupying the area defined by the vertical walls 29 and 30. A conduit 58 leading from the evaporator 57 is shown as being connected with the intake of the compressor 43'. A discharge conduit 59 from the compressor is shown as being connected with one end of the condenser 42''. A conduit 60 connected to the other end of said condenser is connected to the inlet of the evaporator 57. It is to be understood that the refrigeration unit is shown somewhat diagrammatically, the important part of the disclosure being the relative positioning of the units and their positioning with respect to the wall structure of the refrigeration unit and the openings in the walls of the vehicle body 10. In the modification shown in Figs. 1 to 5, air is drawn in from the driver's compartment through the louvers 27 by the fan 52 and by a fan 47 carried on the rotatable structure 46 of the engine 41'. Said fans circulate air through the heat rejecting compartment 40 and therefrom through the louvers of the side opening 42 in the vehicle body 10 and through the louvers 41 of the bottom opening 39'.

It is to be understood that the complete refrigeration unit as described can be removed from the load compartment 17 merely by detaching the angles which seal the insulated walls of the refrigeration unit with respect to the walls, floor and roof of the load compartment. By this means the unit can be readily removed for repair or replacement.

As another important feature of the structure above described, by means of the door 26 access is available to the entire compressor and engine units and the heat rejecting compartment 40 in which these units are located. All ordinary repairs and service, including removal of any of the units in the heat rejecting compartment can be accomplished through the door 26. At the same time the refrigeration unit occupies a minimum amount of floor area due to its particular vertical stack arrangement permitting the use of the wide door 23 for access to the load compartment.

The modification shown in Figs. 6 to 11, inclusive, differs from the form shown in Figs. 1 to 5, inclusive, primarily in that the unit is mounted in a different corner of the load compartment. As shown in Figs. 6 to 11, inclusive, a vehicle body 61' of the type completely surrounding front wheels 62 and rear wheels 63 is provided with a generally rectangular load compartment 64. Said compartment is provided with insulated side walls 65 and 66, an insulated rear wall 69 having a door 70 therein, an insulated front wall 71, an insulated top wall in the form of a roof 72 and an insulated bottom wall forming a floor 73. It will be noted that wheel housings 74 extend up into the load compartment 64 above the floor 73. Because of this obstruction only a limited space is available between these housings 74 and the rear wall 69 of the vehicle body. Also, it is to be noted that the door 70 occupies a substantial portion of the rear wall 69. A refrigeration unit designated in its entirety by the reference character 75, embodying the principles of applicant's invention, is fitted into the corner of the vehicle body longitudinally between the housing 74 and the rear wall 69 and laterally between the side wall 65 and the door 70. Except for the lower end construction the refrigeration unit 75 is very similar to the unit shown in Figs. 1 to 5, inclusive, and above described.

As shown diagrammatically in perspective in Fig. 9, the refrigeration unit 75 has a composite insulated wall section designated in its entirety by the reference character 76. Said wall section includes a vertical wall 77 arranged longitudinally of the load compartment 64 extending approximately two-thirds of the distance vertically from the floor 73 to the roof 72. An offset horizontal wall 78 joins the vertical wall 77 extending somewhat over halfway across the space between the wall 77 and the side wall 65 of the load space. A vertical wall 79 joins with the wall 78 extending upwardly to the roof of the vehicle being shaped to fit the contour of the body 61. An end wall 80 joins the wall 77 extending transversely across the load space 64 and spacing the wall 77 from the side wall 65 of the load compartment. The wall 80 extends upwardly joining the horizontal wall 78 and further joining the vertical wall 79. With such a wall construction the wall section 76 of the refrigeration unit can be fitted into a rear corner of the vehicle body in the load compartment from inside the compartment to form a heat rejecting compartment designated as 81. Said compartment extends laterally from the side wall 65 to the door 70 and longitudinally from the end wall 69 to the wheel housing 74 and vertically from the floor 73 to the roof 72, it being noted that the offset wall 78 provides a step portion which lies within the load compartment and within the space to be refrigerated for a purpose to be now described.

A conventional evaporator 82 is mounted on the horizontal wall 78 in the offset space provided by said wall. Said evaporator lies within the confines of the floor area defined by the walls 77 and 80, whereby valuable load space is not occupied except for the base of the unit. The evaporator 82 is spaced from the wall 79 to provide space for an air circulating fan 83. Said fan is carried by a rotatable shaft 84 which extends through the wall 79 carrying a pulley 85 within the space between the wall 79 and the side wall 65 of the vehicle body, said space being within the heat rejecting compartment 81.

A belt 86 on the pulley 85 is connected to a pulley 87 carried on a rotatable structure 88 which forms a drive means for a refrigerant compressor 89. The rotatable structure 88 carries a circulating fan 90 which is located directly in front of a grill 91 carried by a door 92 mounted over an opening 93 at the rear of the vehicle side wall 65. The door 92 may be fitted in any manner for ready removal to gain access to the compressor and to the elements requiring service or maintenance within the heat rejecting space 81. The opening 93 is of such size that the compressor 89, which is carried by a mounting structure 94, can be readily removed through the opening 93. The rotatable structure 88 also carries a second pulley 95 which is connected by a belt 96 with a pulley 97 on a shaft 98 of an internal combustion engine 99. Said engine is shown as being mounted on a bracket structure 100 secured to a side frame member 101 of the vehicle chassis. A transverse frame member 102 is also shown in Figure 8. The crank shaft 98 also carries an air circulating fan 103 which is placed directly back of a grill 104 carried by a door 105 mounted over an opening 106 in the side wall 65 at the rear thereof and at the lower end thereof. The door 105 may be fitted for removal by any conventional means, it being understood that said door is large enough for access to the engine 99 for maintenance and repair or for removal as a unit of said engine from the heat rejecting compartment 81.

A starting battery 107 and a starting motor 108 are indicated in Fig. 8 to illustrate the provision of all necessary components of a refrigeration unit within the heat rejecting space 81. A conventional tube and fin type of condenser 109 is illustrated as being positioned horizontally in the heat rejecting space or compartment 81 between the compressor 89 and the engine 99. It is to be understood that said condenser is carried with the wall section 76 of the refrigeration unit. A gasoline tank 110 is shown positioned between the compressor 89 and the vertical wall 77 for again to illustrate a complete self-contained unit. Although it is to be understood that gasoline for operating this unit can be obtained from the fuel tank of the vehicle to economize on space and servicing.

A conduit 111 leading from one end of a coil 112, forming a part of the evaporator 82, is connected with one end of a coil 113 forming a part of the condenser 109. A conduit 114 connected to the other end of the coil 113 is connected to the exhaust of the compressor 89. The conduit 111 connected to the intake of the compressor 89 is connected to the other end of the coil 115 connected to the other end of the evaporator coil 112.

It will be noted in the construction of Figs. 6 to 11, inclusive, that the heat rejecting compartment extends below the floor 73 of the load compartment, whereby additional vertical space is obtained for the operative units of the refrigerating system. As provision has been made for removing the units from the side wall of the vehicle, it should not be necessary to frequently remove the entire refrigeration unit and for that reason provision was not made to remove this unit in its entirety as a unit from the vehicle, although by removing the engine separately and by disconnecting supporting and bracing structures, such as the vertical member 116 shown in Fig. 8, and 117 as shown in Fig. 6, the remainder of the unit may be removed from the vehicle body.

With the construction as shown in Fig. 8, the fans 90 and 103 are operated to circulate air through the heat rejecting compartment 81, thereby cooling the compressor 89 and the engine 99. It will be noted that the bottom of the heat rejecting compartment 81 is open, whereby air may circulate therethrough to facilitate cooling and the heat rejection from the compartment 81. The fan 83 circulates air in the insulated and refrigerated load compartment 64 over the coils 112 of the evaporator 82.

By a construction as illustrated and described a minimum amount of floor space is occupied by a refrigeration unit, which by its vertical stack arrangement provides sufficient space for the entire refrigeration system. Also, the arrangement is such that a minimum amount of space laterally and longitudinally is occupied by the refrigeration unit, whereby said unit may be fitted in one corner of the load compartment back of a wheel housing and laterally of a large central rear door.

It is to be understood that applicant has shown and described only a preferred embodiment of his improved refrigeration unit, particularly designed for and adapted to specific types of load compartments, but that he claims as his invention all modifications falling within the scope of the appended claims.

What is claimed is:

1. A refrigerated automotive vehicle having a laterally extending driver's compartment at the front end thereof with a driver's station at one side thereof and a generally rectangular load compartment at the rear of the driver's compartment and in combination therewith, an engine and compressor compartment immediately back of the driver's station, an internal combustion engine located at floor level at the rear of the driver's compartment and at one side thereof, a compressor located above the engine, belt means for driving the compressor from the engine, a wall between the driver's compartment and the load compartment, an opening in said wall laterally extending across the space occupied by the engine and the compressor and vertically also covering said space, a grid over said opening, fans connected to the compressor and the engine constructed to draw in air through said grid, an insulating wall surrounding the rear and side said engine and compressor compartment and extending forwardly over a portion of the top of said compartment and therefrom to the top of the load compartment, an evaporator mounted within the load compartment above the compressor and on the refrigerated side of the insulated wall, an air circulating fan arranged adjacent said evaporator, drive means extending through the vertical top portion of the insulated wall, belt means extending from said compressor to said driving means for operating the fan, and a condenser located horizontally between the compressor, the engine, the space at the bottom of the engine and compressor compartment being open for the discharge of air downwardly therethrough, said body being formed with an opening at the side thereof adjacent the engine and compressor compartment and a grid formed over said opening for the discharge of air therethrough.

2. A refrigerated automotive vehicle having a laterally extending driver's compartment at the front end thereof with a driver's station at one side thereof and a generally rectangular load compartment at the rear of the driver's compartment, an engine and compressor compartment immediately back of the driver's station, an internal combustion engine located in said compartment, a compressor located in said compartment, means for driving the compressor from the engine, a wall between the driver's compartment and the load compartment, an opening in said wall, a fan connected to be driven by the engine constructed to draw in air through said opening, an insulating wall surrounding the rear and side said engine and compressor compartment and extending forwardly over a portion of the top of said compartment and therefrom to the top of the load compartment, an evaporator mounted within the load compartment above the compressor and on the refrigerated side of the insulation, an air circulating fan arranged adjacent said evaporator, drive means extending through the vertical top portion of the insulated wall, belt means extending from said compressor to said driving means for operating the fan, and a condenser located horizontally between the compressor and the engine, said body being formed with an opening at the side thereof adjacent the engine and compressor compartment and a grid formed over said opening for the discharge of air therethrough.

3. A refrigerated automotive vehicle having a laterally extending driver's compartment at the front end thereof with a driver's station at one side thereof and a generally rectangular load compartment at the rear of the driver's compartment, an engine and compressor compartment immediately back of the driver's station and occupying substantially half of the lateral width of the load compartment, an entrance door to the load compartment from the driver's compartment occupying substantially the other half of the width of the load space, an internal combustion engine located at floor level at the rear of the driver's compartment and at one side thereof, a compressor located above the engine, belt means for driving the compressor from the engine, a wall between the driver's compartment and the load compartment, an opening in said wall laterally extending across the space occupied by the engine and the compressor and vertically also covering said space, a grid over said opening, air circulation means connected to the compressor and the engine constructed to draw in air through said grid, an insulating wall surrounding the rear and side said engine and compressor compartment and extending forwardly over a portion of the top of said compartment and therefrom to the top of the load compartment, an evaporator mounted within the load compartment above the compressor and on the refrigerated side of the insulation, an air circulating fan arranged adjacent said evaporator, drive means extending through the vertical top portion of the insulated wall, belt means extending from said compressor to said driving means for operating the fan, said body being formed with an opening at the side thereof adjacent the engine and compressor compartment and a grid formed over said opening for the discharge of air therethrough and a condenser located between openings in the wall provided for the circulation of air.

4. A refrigerated automotive vehicle having a generally rectangular load compartment, said load compartment having insulated side, end, top and bottom walls, a refrigerating mechanism compartment within the load compartment, a portion of one side wall, an adjoining end wall and the adjacent corner of the bottom wall of the load compartment at one corner forming respectively the end wall, a transverse wall and the bottom wall of the mechanism compartment, an insulated wall section including joined vertical walls fitted into said corner to form the remaining vertical walls of said mechanism compartment, said mechanism compartment being completed by an insulated top wall structure which joins the walls of the insulated section with the walls of the load compartment, said portions of the load compartment walls which form walls of the mechanism compartment having openings for the flow of air into and out of said compartment, a refrigerating mechanism including an engine and compressor mounted one above the other in the mechanism compartment thereby occupying the minimum floor space in the load compartment, a condenser in the mechanism compartment and occupying the same minimum floor space as the engine and compressor, air circulation means in the mechanism compartment arranged to circulate air through the wall openings and over the engine and compressor and condenser, an evaporator with air circulating means mounted above and at the top of the mechanism compartment and in the load compartment and occupying the same vertically projected floor space, said refrigeration structure with its insulated wall structure being integrally constructed for installation and removal as a unit.

5. A refrigerated automotive vehicle having a generally rectangular load compartment, said compartment having side walls, a front wall, a rear wall, a bottom wall, and a roof and in combination with said compartment, an insulated wall section having two vertical walls joined together at right angles, said section being fitted into one corner of the load compartment against the adjacent corner portion of the bottom wall and against the corner portions of two adjoining load compartment walls, an insulated upper wall structure joining the upper ends of the walls of the insulated wall section and the walls of the load compartment, a portion of said structure being horizontal, said insulated section with the insulated wall structure forming with the enclosed corner portions of the load compartment walls a heat rejecting compartment, an engine, a compressor and a condenser located in said heat rejecting compartment, air inlet and air outlet openings in the portions of the load compartment walls which form portions of the heat rejecting compartment, air circulating means for delivering air through said openings and over said condenser, and an evaporator and air circulating means mounted in the load compartment above the heat rejecting compartment and on the horizontal portion of the upper wall structure and within the vertical projected floor area confines of the heat rejecting compartment.

6. A device as set forth in claim 5 in which a portion of the upper wall structure extends upwardly to provide a vertical extension of the heat rejecting compartment, a drive shaft extends through said upwardly extending portion, the air circulating means for the evaporator being driven from said shaft, and means are provided in the heat rejecting compartment for driving said shaft.

7. A device as set forth in claim 5 in which the vehicle has a transverse operator's compartment ahead of the load compartment, the front wall of the load compartment forming the rear wall of the operator's compartment, and in which the heat rejecting compartment occupies one of the front corners of the load compartment with one of the air circulating openings being in the corner portion of the front wall which forms one wall of the heat rejecting compartment.

8. A device as set forth in claim 5 in which the vehicle has a transverse operator's compartment ahead of the load compartment with an operator's station at one side thereof, the heat rejecting compartment being located immediately to the rear of the operator's station, and in which an entrance door from the operator's compartment to the load compartment is located in the front walls of the load compartment at the side opposite the operator's station and the heat rejecting compartment.

9. A refrigeration unit adapted to be mounted in a refrigerated automotive vehicle with a generally rectangular load compartment having side walls, a front wall, a rear wall, a bottom wall, and a roof comprising an insulated wall section having two vertical walls joined together at right angles, said section being adapted to be fitted into one corner of the load compartment against the adjacent corner portion of the bottom wall and against the corner portions of two adjoining load compartment walls, an insulated upper wall structure joining the upper ends of the walls of the insulated wall section and adapted to abut the walls of the load compartment, a portion of said structure being horizontal, said insulated section with the insulated wall structure being adapted to form with the enclosed corner portions of the load compartment walls a heat rejecting compartment, an engine, a compressor and a condenser being located in said heat rejecting compartment and an evaporator and air circulating means adapted to project in the load compartment above the heat rejecting compartment and being mounted on the horizontal portion of the upper wall structure and within the vertical projected floor area confines of the heat rejecting compartment, said refrigeration unit with its insulated wall structure being integrally constructed for installation and removal as a unit.

10. A device as set forth in claim 9 in which a portion of the upper wall structure extends upwardly to provide a vertical extension of the heat rejecting compartment, a drive shaft extends through said upwardly extending portion, the air circulating means for the evaporator being driven from said shaft, and means are provided in the heat rejecting compartment for driving said shaft.

RUSSEL D. ACTON.

REFERENCES CITED

The following references are of record in the file of this patent:

UNITED STATES PATENTS

| Number | Name | Date |
|---|---|---|
| 1,889,686 | McKee | Nov. 29, 1932 |
| 2,058,872 | Heideman | Oct. 27, 1936 |
| 2,106,637 | Hauser | Jan. 25, 1938 |
| 2,257,164 | Euwer | Sept. 30, 1941 |
| 2,311,622 | Alexander | Feb. 23, 1943 |
| 2,459,946 | Kirkpatrick | Jan. 25, 1949 |

FOREIGN PATENTS

| Number | Country | Date |
|---|---|---|
| 323,075 | Italy | Dec. 6, 1934 |